(12) United States Patent
Appleton

(10) Patent No.: US 7,251,937 B2
(45) Date of Patent: Aug. 7, 2007

(54) CHARGE AIR COOLER DRAIN SYSTEM

(75) Inventor: Andy Blaine Appleton, Cedar Falls, IA (US)

(73) Assignee: Deere & Company, Moline, IL (US)

( * ) Notice: Subject to any disclaimer, the term of this patent is extended or adjusted under 35 U.S.C. 154(b) by 80 days.

(21) Appl. No.: 11/274,739

(22) Filed: Nov. 15, 2005

(65) Prior Publication Data

US 2007/0107425 A1    May 17, 2007

(51) Int. Cl.
*F02B 29/04*    (2006.01)
(52) U.S. Cl. .................... 60/599; 60/599; 123/563
(58) Field of Classification Search ............... 60/599, 60/605.2
See application file for complete search history.

(56) References Cited

U.S. PATENT DOCUMENTS

| | | | |
|---|---|---|---|
| 6,073,446 A * | 6/2000 | Aeffner | 60/599 |
| 6,301,887 B1 * | 10/2001 | Gorel et al. | 60/605.2 |
| 6,748,741 B2 | 6/2004 | Martin et al. | 60/605.2 |
| 2007/0044469 A1 * | 3/2007 | Harada et al. | 60/599 |

* cited by examiner

Primary Examiner—Thomas Denion
Assistant Examiner—Mary A. Davis

(57) ABSTRACT

A charge air cooler drain system is provided for an engine system having a turbo-compressor and a charge air cooler for cooling air compressed by the turbo-compressor. The drain system includes a reservoir for storing condensation and having a reservoir inlet and a reservoir outlet A check valve is connected between the reservoir inlet and a condensation outlet of the charge air cooler. The check valve is biased to a closed position by a first spring. The drain system also includes a pilot operated valve connected between the reservoir outlet and atmosphere. The pilot operated valve is biased to an open position by a second spring, and has a pilot inlet exposed to pressure in the charge air cooler. The pilot operated valve closes when pressure in the charge air cooler exceeds a threshold pressure. The first and second springs are chosen so that the check valve is closed when the pilot operated valve is open and the pilot operated valve is closed when check valve is open.

5 Claims, 1 Drawing Sheet

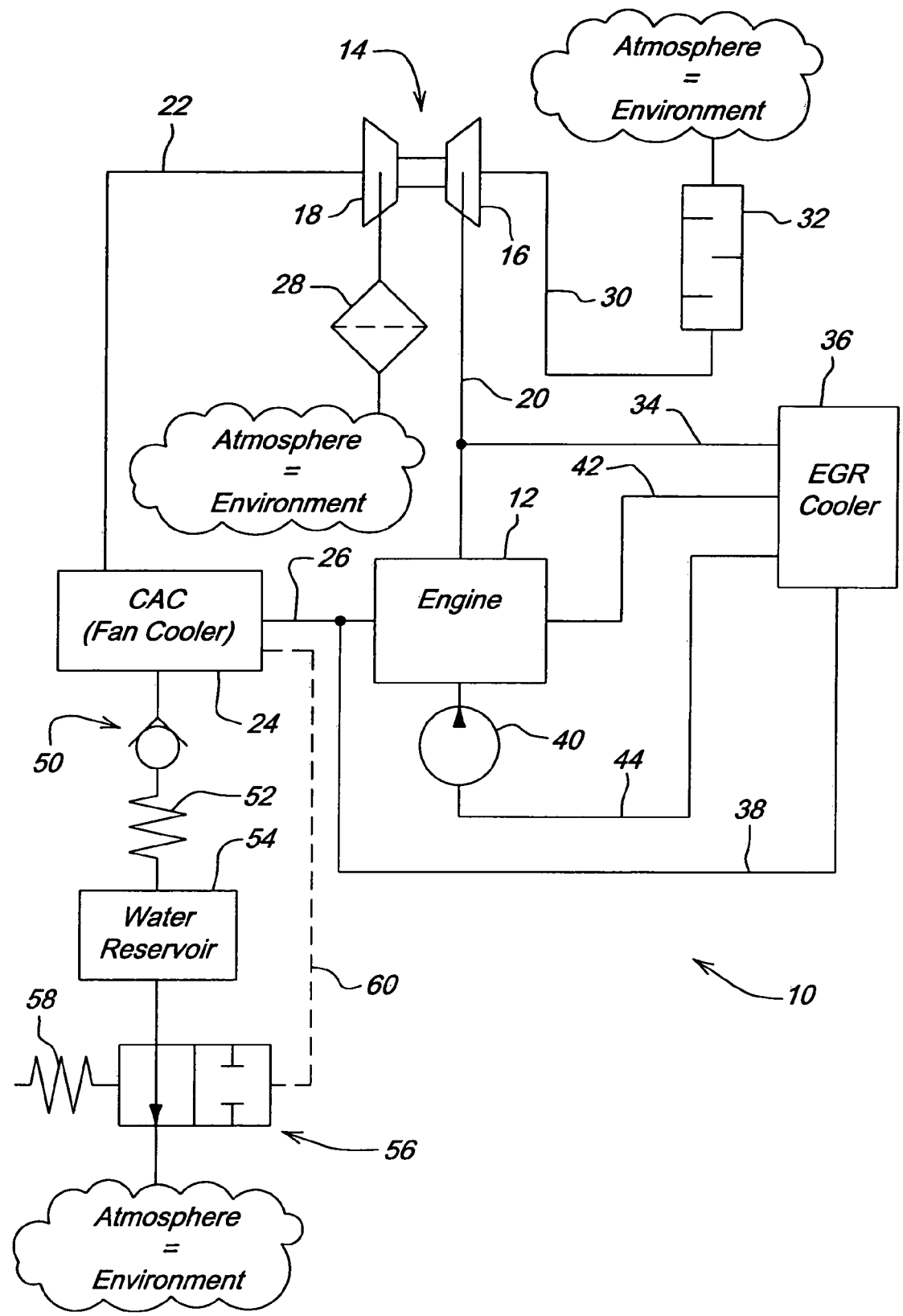

CHARGE AIR COOLER DRAIN SYSTEM

BACKGROUND

The present invention relates to a drain system for a charge air cooler for an engine.

Charge air coolers are used with engines to cool air compressed by a turbo-compressor. In the process of cooling the air, moisture (water) can condense from the air and collect in the charge air cooler. The condensed liquid water can be drawn into the engine, thus causing engine component corrosion. The water in the charge air cooler can freeze and crack the charge air cooler when the engine is off when the temperature is low. A hydraulic lock may result if significant amounts of liquid enter the engine.

One solution is to bleed liquid condensation from the charge air cooler using of a valve in the bottom of the cooler. This has been done on production John Deere marine engines which operate in high humidity conditions which cause condensation. The valve allows water to exit the cooler when the pressure in the cooler is low, such as when the engine under low load, is idle or is off.

However, such a valve cannot be used in off-road vehicle applications because the air in the off-road environment has high concentrations of dust. This dust, if allowed to enter the charge air cooler in low boost pressure situations would damage the engine. Low engine load can lead to low turbocharger boost pressure. In the charge air cooler, the actual pressure may be a vacuum under these conditions similar to the intake manifold vacuum of a naturally aspirated engine. In such situations, an open pathway from the environment into the charge air cooler would allow dirty air directly into the engine (by-passing the air cleaner).

Future engines will be designed for off-road vehicles and to meet Tier 3 emission regulations. Such engines will have higher compression producing higher temperature rises and thermal loads on the charge air cooler. This, combined with lower outlet temperature requirements will aggravate condensation problems for off-road vehicles like John Deere tractors.

SUMMARY

Accordingly, an object of this invention is to provide a system drain system for a charge air cooler which prevents air and debris from moving into the charge air cooler during periods of low boost pressure or vacuum.

This and other objects are achieved by the present invention, wherein a charge air cooler drain system is provided for an engine system having a turbo-compressor and a charge air cooler for cooling air compressed by the turbo-compressor. The drain system includes a reservoir for storing condensation and having a reservoir inlet and a reservoir outlet. A check valve is connected between the reservoir inlet and a condensation outlet of the charge air cooler. The check valve is biased to a closed position by a first spring. The drain system also includes a pilot operated valve connected between the reservoir outlet and atmosphere. The pilot operated valve is biased to an open position by a second spring, and has a pilot inlet exposed to pressure in the charge air cooler. The pilot operated valve closes when pressure in the charge air cooler exceeds a threshold pressure. The first and second springs are chosen so that the check valve is closed when the pilot operated valve is open and the pilot operated valve is closed when check valve is open. The valves and the reservoir cooperate to prevent air and debris movement into the charge air cooler during periods of low boost pressure or vacuum in the charge air cooler.

BRIEF DESCRIPTION OF THE DRAWINGS

The sole FIGURE is a simplified schematic diagram of a charge air cooler drain system according to the present invention.

DETAILED DESCRIPTION

An engine system 10 for a vehicle, such as an agricultural tractor, includes and engine 12 and a turbo-compressor 14 having a turbine 16 which drives a compressor 18 and which receives exhaust from engine 12 through exhaust line 20. Air compressed by compressor 18 is communicated by line 22 to a charge air cooler 24. Cooled compressed air is communicated by line 26 from charge air cooler 24 to an inlet of the engine 12. An air filter 28 filters air entering the compressor 18. Exhaust from the engine flows through the turbine 16, exhaust line 30 and a muffler 32. An EGR line 34 communicates exhaust to an EGR cooler 36. EGR cooler 36 communicates cooled EGR to the engine 12 via lines 38 and 26. A coolant pump 40 and lines 42 and 44 circulate coolant between the engine 12 and the EGR cooler 36.

According to the present invention, a check valve 50 with check valve spring 52 is connected to a condensation drain outlet of the charge air cooler 24. Check valve spring 52 biases valve 50 to a closed position. Valve 50 opens to permits one-way flow of condensation from charge air cooler 24 to a condensation reservoir 54. A reservoir valve 56 is connected between an outlet of reservoir 54 and the environment. Valve 56 is a pilot operated valve which is biased to an open position by spring 58 and urged to a closed position by the pressure in charge air cooler 24 which is communicated to valve 56 by pilot line 60.

Boost pressure is the pressure created in the charge air cooler 24 by the turbocharger 14. When this boost pressure exceeds the force of check valve spring 52, check valve 50 is opened and condensation flows from the charge air cooler 24 to the reservoir 54. When the boost pressure is low, the check valve 50 will be closed, thus closing communication between the charge air cooler 24 and the reservoir 54. Preferably, the reservoir 54 should be large enough to hold expected water condensation between cycles of low to high boost pressure.

Valve 56 will be normally open to the atmosphere. Preferably, gravity will cause the water to drain from the reservoir 54 through the open valve 56. Water being heavier than air, this valve 56 should be located at the lowest point of the charge air cooler 24.

When the charge air cooler 24 is pressurized with boost pressure, this pressure will be communicated to the valve 56 through pilot line 60. This pressure will close valve 56 and close communication between the reservoir 54 and the atmosphere.

Preferably, the springs 52 and 58 are chosen so that the valve 50 is closed when valve 56 is open and valve 56 is closed when valve 50 is open. In this way, the charge air cooler 24 will always be isolated from the atmosphere or environment, thus preventing contamination from entering into the charge air cooler 24 and engine 12. This is accomplished by selection of opening and closing spring forces and pressure thresholds.

This drain system will have the following operating states: When the pressure in charge air cooler 24 is low or vacuum, valve 50 is closed, valve 56 is open and water can drain to the environment from the reservoir 54. When the pressure in charge air cooler 24 rises: valve 56 will close, valve 50 remains closed. As the pressure in charge air cooler 24 continues to rise: valve 56 will remain closed, valve 50 opens and water drains from the charge air cooler 24 to the reservoir 54. As this pressure drops from high to low, the above sequence of events reverses.

Preferably, the valves 50 and 56 should be designed so that the pressure in the charge air cooler 24 cycles through the opening/closing states of the valves 50 and 56 during normal operation of the vehicle (not shown) which the engine 12 is powering. Examples could include end of field turnarounds, shutdowns or other variable loading condition that varies turbocharger pressure.

Having valve 56 normally open will allow the water to drain from the reservoir 54 upon shutdown of the vehicle (not shown). This will allow water to drain from the system before the system cools down during cold weather. If the water is allowed to remain in any of the system, it could freeze and cause part damage from expansion during freezing.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

I claim:

1. A charge air cooler drain system for an engine system having a turbo-compressor and a charge air cooler for cooling air compressed by the turbo-compressor, the drain system comprising:

a reservoir for storing condensation and having a reservoir inlet and a reservoir outlet;

a check valve connected between the reservoir inlet and a condensation outlet of the charge air cooler, the check valve being biased to a closed position by a first spring; and a pilot operated valve connected between the reservoir outlet and atmosphere, the pilot operated valve being biased to an open position by a second spring, the pilot operated valve having a pilot inlet exposed to pressure in the charge air cooler, the pilot operated valve closing when pressure in the charge air cooler exceeds a threshold pressure.

2. The charge air cooler drain system of claim 1, wherein:

the first and second springs are chosen so that the check valve is closed when the pilot operated valve is open and the pilot operated valve is closed when check valve is open.

3. A charge air cooler drain system for an engine system having a turbo-compressor and a charge air cooler for cooling air compressed by the turbo-compressor, the drain system comprising:

a reservoir for storing condensation and having a reservoir inlet and a reservoir outlet;

a first valve connected between the reservoir inlet and a condensation outlet of the charge air cooler; and a second valve connected between the reservoir outlet and atmosphere, the first valve being closed when the second valve is open and the second valve being closed when the first valve is open.

4. The charge air cooler drain system of claim 3, wherein:

the first valve comprises a check valve biased to a closed position by a first spring.

5. The charge air cooler drain system of claim 3, wherein:

the second valve comprises a pilot operated valve biased to an open position by a second spring, the pilot operated valve having a pilot inlet exposed to pressure in the charge air cooler, the pilot operated valve closing when pressure in the charge air cooler exceeds a threshold pressure.

* * * * *